United States Patent [19]

Suzuki

[11] Patent Number: 5,226,954
[45] Date of Patent: Jul. 13, 1993

[54] ORGANOSILICON COMPOSITION

[75] Inventor: Takehiro Suzuki, Tokyo, Japan

[73] Assignee: Toyo Ink Manufacturing Co., Ltd., Tokyo, Japan

[21] Appl. No.: 815,166

[22] Filed: Dec. 31, 1991

Related U.S. Application Data

[63] Continuation-in-part of Ser. No. 640,625, Dec. 21, 1990, abandoned.

[30] Foreign Application Priority Data

Dec. 22, 1989 [JP] Japan ................................. 1-333085
Jul. 20, 1990 [JP] Japan ................................. 2-192006
Oct. 26, 1990 [JP] Japan ................................. 2-290210

[51] Int. Cl.$^5$ ................................................. C09K 3/00
[52] U.S. Cl. .................................. 106/2; 106/287.13; 106/287.14; 106/287.16
[58] Field of Search ................ 106/287.13, 287.14, 106/287.16, 2

[56] References Cited

U.S. PATENT DOCUMENTS

| | | | |
|---|---|---|---|
| 4,602,959 | 7/1986 | Kurita et al. | 106/287.14 |
| 4,648,904 | 3/1987 | De Pasquale et al. | 106/287.14 |
| 4,865,649 | 9/1989 | Kashiwagi et al. | 106/287.16 |
| 4,877,654 | 10/1989 | Wilson | 106/287.13 |
| 4,999,249 | 3/1991 | Deschler et al. | 106/287.13 |

Primary Examiner—John C. Bleutge
Assistant Examiner—Karen A. Dean
Attorney, Agent, or Firm—Wenderoth, Lind & Ponack

[57] ABSTRACT

An organosilicon composition comprising 99.9 to 50% by weight of an alkylalkoxysilane and/or a condensate thereof and 0.1 to 50% by weight of an emulsifier mixture containing 0.01 to 20% by weight, based on the total amount of the emulsifier mixture, of an anionic emulsifier and 80 to 99.99% by weight, based on the total amount of the emulsifier mixture, of a nonionic emulsifier, the organosilicon composition forming a stable aqueous emulsion free from separation for a long period of time, having excellent waterproofness and excellent stability as an aqueous emulsion, having excellent permeability into civil engineering and construction materials, and imparting civil engineering and construction materials with excellent fungiproofness and antibacterial properties.

13 Claims, No Drawings

ORGANOSILICON COMPOSITION

This application is a continuation-in-part of now abandoned application, Ser. No. 07/640,625 filed Dec. 21, 1990 now abandoned.

FIELD OF THE INVENTION

This invention relates to an organosilicon composition useful as a barrier preventer or water proofing composition for use in civil engineering and construction materials such as concrete, etc., and to an aqueous emulsion thereof. More specifically, this invention relates to an organosilicon composition capable of forming an aqueous emulsion which is stable for a long period of time, and to an organosilicon composition having excellent fungiproof properties and an aqueous emulsion thereof.

DESCRIPTION OF RELATED PRIOR ART

It is widely known that alkylalkoxysilane is useful as a water repellent material for civil engineering and construction materials such as concrete, etc. In general, alkylalkoxysilane is used by diluting it with a variety of solvents. Such a solvent type composition is limited in use depending upon the properties of the solvent employed such as its toxicity, volatility, flammability, and the like. For example, when isopropyl alcohol, which is comparatively less toxic, is used, penetration thereof into a substrate material is limited due to its high evaporation rate. On the other hand, when a solvent which does not easily volatilize is used, a coated surface is liable to keep a wet state and is difficult to dry. Further, there is generally a problem in that a solvent-type composition cannot be coated on a wet concrete surface.

In order to overcome the above problems and use alkylalkoxysilane as a barrier preventer for concrete, it is ideal to form a water solution or aqueous dispersion of alkylalkoxysilane. Since, however, alkylalkoxysilane is liable to undergo hydrolysis and a subsequent condensation reaction, it has been very difficult to keep alkylalkoxysilane stable in water.

In order to overcome these problems, there has been recently reported a process for emulsifying a hydrolyzable organosilicon compound such as alkyltrialkoxysilane in water in the presence of a nonionic emulsifier having HLB of 4 to 15 (JP-A-62-197369). However, when only a nonionic emulsifier is used, a two-phase separation easily takes place, and no stable aqueous emulsion can be easily obtained. It is difficult to select optimum conditions such as an HLB value of a nonionic emulsifier, an amount of the emulsifier, an emulsifying method, etc., according to a silane to be emulsified. Further, if a balance between waterproofness and stability or permeability is taken into consideration, only a limited number of emulsifiers are available. For example, there is a problem in that permeability to concrete, etc., differs depending upon the state, solid or liquid, of an emulsifier even if the HLB is the same.

Further, even if a water absorption preventer is used, there has recently been a problem on contamination caused by fungi occurrence. Therefore, a fungiproofing agent is added subsequently to cope with this problem, and due to the addition thereof, no durable composition has been obtained at present.

SUMMARY OF THE INVENTION

It is an object of this invention to provide an organosilicon composition which forms a stable aqueous emulsion free from separation for a long period of time.

It is another object of this invention to provide an organosilicon composition having excellent waterproofness and excellent stability as an aqueous emulsion.

It is further another object of this invention to provide an organosilicon composition having excellent permeability into civil engineering and construction materials such as concrete, etc.

It is still further another object of this invention to provide an organosilicon composition which imparts civil engineering and construction materials such as concrete, etc., with excellent fungiproofness and antibacterial properties.

According to this invention (first aspect of the invention), there is provided an organosilicon composition comprising 99.9 to 50% by weight of an alkylalkoxysilane and/or a condensate thereof and 0.1 to 50% by weight of an emulsifier mixture containing 0.01 to 20% by weight, based on the total amount of the emulsifier mixture, of an anionic emulsifier and 80 to 99.99% by weight, based on the total amount of the emulsifier mixture, of a nonionic emulsifier.

Further, according to this invention (second aspect of the invention), there is provided an organosilicon composition comprising an alkylalkoxysilane and/or a condensate thereof, and an organosilicon compound containing an alkoxysilyl group and a quaternary ammonium salt group in the molecule and/or a condensate thereof.

DETAILED DESCRIPTION OF THE INVENTION

The organosilicon composition of this first aspect of the invention, which is prepared by emulsifying alkylalkoxysilane and/or a condensate thereof in water in the presence of an emulsifier mixture of a nonionic emulsifier with an anionic emulsifier (the amount of the anionic emulsifier based on the total amount of the emulsifier mixture is 0.01 to 20% by weight, preferably 0.1 to 20% by weight), not only has excellent stability in performance as a barrier preventer for construction materials but also has stability in appearance since it does not undergo separation. Further, it can be easily produced since there is no particular necessity to select various conditions for the emulsification. Further, surprisingly, the emulsification is successful with the above emulsifier mixture whose amount is as small as less than 0.5% by weight based on alkylalkoxysilane.

In the present invention, the term "emulsification" refers to a case where an alkylalkoxysilane mixed with an emulsifier is, as a whole, in an opaque state, and it also refers to a state in which a small amount water is separated to form a lower layer which is somewhat more transparent than an upper layer. "Not emulsified" stands for a state where an upper layer is transparent as compared with a lower layer.

The alkylalkoxysilane used in this invention is not specially limited. When the alkylalkoxysilane is used as a component of an aqueous emulsion, however, it is selected from those in which an alkyl group directly bonded to silicon has 6 to 20 carbon atoms, and the alkoxy group may be a methoxy or ethoxy, and is preferably an ethoxy group. And the alkylalkoxysilane is preferably monoalkyltrialkoxysilane.

Examples of the alkylalkoxysilane are hexyltriethoxysilane, heptyltriethoxysilane, octyltriethoxysilane, nonyltriethoxysilane, decyltriethoxysilane, undecyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane, nonadecyltriethoxysilane, eicosyltriethoxysilane, octadecylmethyldiethoxysilane, and a mixture of these. Further, condensates of the above compounds may be also used. The above compounds (noncondensate) are effective to prevent penetration of water within civil engineering and construction materials such as concrete, and the condensates thereof are effective to prevent penetration of water on a concrete surface.

When the alkyl group directly bonded to silicon has less than 6 carbon atoms, the resultant alkylalkoxysilane has high hydrolyzability and volatility. Therefore, immediately after the organosilicon composition is coated on a substrate, not only part of the alkylalkoxysilane reacts on the substrate surface and defers permeation of the organosilicon composition, but also an unreacted silane component easily evaporates during such deferred period. As a result, only the substrate surface is merely imparted with water repellency. On the other hand, when the alkyl group directly bonded to silicon has more than 20 carbon atoms, the permeation of the resultant alkylalkoxysilane is difficult since its molecular weight is too high. An alkylmethoxysilane has higher hydrolyzability than an alkylethoxysilane. Therefore, when an alkylmethoxysilane alone is emulsified in an aqueous medium, and when the resultant emulsion is stored under heat at 50° C., the hydrolysis and polycondensation of the alkylmethoxysilane are promoted, and the emulsion is gelled or forms a precipitate of a polymer in about one month, although the emulsion, if stored at room temperature, shows no change in the emulsion state. An alkylethoxysilane causes neither gelation nor formation of a precipitate even if an emulsion of the alkylethoxysilane in an aqueous medium is stored at 50° C. for one month. An alkylethoxysilane and an alkylmethoxysilane may be used in combination. When the alkoxy group is a group whose carbon number is not less than that of a propoxy group, the resultant alkylalkoxysilane is too stable and is liable to be slow in bonding to a substrate even if it has permeated the substrate. Dialkyldialkoxysilane and trialkylmonoalkoxysilane may be used in combination with monoalkyltrialkoxysilane although the reactivity thereof with a silanol group, etc., on the substrate surface is poor to some extent.

In addition, these alkylalkoxysilanes may be selected from those prepared by converting α-olefin compounds to hydrosilyl compounds with hydroalkoxysilane, which conversion reaction can be carried out at a low cost. For this conversion, a transition metal catalyst or radical initiator usually used for the conversion of an olefin to a hydrosilyl compound may be used as a catalyst. Examples of the transition metal catalyst are transition metal complex or halogenation product of platinum, cobalt, rhodium, palladium, nickel, or the like, and examples of the radical initiator are azobisisobutyronitrile, benzoyl peroxide, di-tert-butyl peroxide, tert-butyl benzoate, etc. In view of safety, reaction efficiency, economy and reaction conditions, preferred is a process using chloroplatinic acid, widely employed in industry.

The amount of the catalyst is not critical when, for example, chloroplatinic acid is used. However, in view of both economy and hygiene, the less, the better. When 0.1 to 5 mmol %, based on silane, of a chloroplatinic acid catalyst is used, the conversion to a hydrosilyl compound is not less than 98% under heat at 90° C. for 5 hours. In general, the catalyst is used by dissolving it in a solvent. This conversion reaction quantitatively proceeds, and a very small amount of the catalyst suffices for the conversion. Therefore, it is not necessary to purify the reaction product as far as neither residual silane nor the residual catalyst poses a toxicity problem.

The nonionic emulsifier is not specially limited. Examples of generally usable nonionic emulsifiers are glycerol monostearate, glycerol monooleate, sorbitan monolaurate, sorbitan monopalmitate, sorbitan monostearate, sorbitan tristearate, sorbitan monooleate, sorbitan trioleate, sorbitan monosesquioleate, polyoxyethylenesorbitan monolaurate, polyoxyethylenesorbitan monopalmitate, polyoxyethylenesorbitan monostearate, polyoxyethylenesorbitan tristearate, polyoxyethylenesorbitan monooleate, polyoxyethylenesorbitan trioleate, polyoxyethylenesorbitol tetraoleate, polyoxyethylenelauryl ether, polyoxyethylenecetyl ether, polyoxyethylenestearyl ether, polyoxyethyleneoleyl ether, polyoxyethylene higher alcohol ether, polyoxyethyleneoctylphenyl ether, polyoxyethylenephenyl ether, and the like.

Besides the above generally usable nonionic emulsifiers, fluorine or silicone nonionic emulsifiers may be used.

Examples of the silicone nonionic emulsifiers are polyalkylene-modified polydimethylsiloxane compounds of the formula (I)

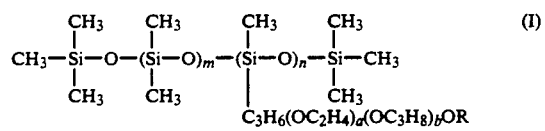

wherein each of m, n, a and b is independently a positive integer, each of a and b is preferably 1 to 50 independently, and R is an alkyl group, preferably an alkyl group having 1 to 8 carbon atoms, or H, or the formula (II)

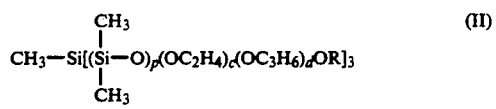

wherein each of p, c and d is independently a positive integer, each of c and d is preferably 1 to 50 independently, and R is an alkyl group, preferably an alkyl group having 1 to 8 carbon atoms, or H.

Examples of the fluorine nonionic emulsifiers are fluorinated alkyl-containing polyalkylene oxide compounds of the formula,

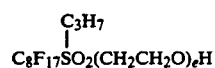

wherein e is a positive integer, preferably 1 to 50.

The nonionic emulsifier used in this invention is freely selected from the above emulsifiers. In order to produce an emulsion being stabler and capable of permeating construction substrates such as concrete deeper, however, a liquid nonionic emulsifier is preferred.

The anionic emulsifier for use is not specially limited. Examples of the anionic emulsifiers are sodium lauryl sulfate, triethanolamine lauryl sulfate, ammonium lauryl sulfate, sodium dodecylbenzene sulfonate, sodium alkylnaphthalene sulfonate, sodium dialkylsulfosuccinate, sodium alkyldiphenylether disulfonate, diethanolamine alkylphosphate, potassium alkylphosphate, sodium polyoxyethylenelaurylether sulfate, sodium polyoxyethylenealkylether sulfate, triethanolamine polyoxyethylenealkylether sulfate, sodium polyoxyethylenealkylphenylether sulfate, sodium alkane sulfonate, mixed fatty acid sodium soap, semi-hardened beef tallow fatty acid sodium soap, semi-hardened beef tallow fatty acid potassium soap, sodium stearate soap, potassium oleate soap, caster oil potassium soap, higher alcohol sodium sulfate, sodium salt of β-naphthalenesulfonic acid formalin condensate, special aromatic sulfonic acid formalin condensate, special carboxylic acid type surface active agent, special polycarboxylic acid type high molecular weight surface active agent, and the like.

The amount of the anionic emulsifier based on the total amount of the emulsifier mixture is 0.01 to 20% by weight, preferably 0.1 to 20% by weight, more preferably 0.1 to 5% by weight. When the anionic emulsifier or the nonionic emulsifier is used alone, or when the amount of the anionic emulsifier based on the total amount of the emulsifier is larger than the above range, it is difficult to produce a stable emulsion, and the resultant emulsion easily undergoes separation, which difficulties eventually limit conditions for the emulsification.

The amount of the emulsifier mixture is preferably 0.1 to 50% by weight based on the total amount of the organosilicon composition. When the amount of the emulsifier mixture is less than 0.1% by weight, no stable emulsion can be obtained, and functional stability of the emulsion is poor. When it is more than 50% by weight, no performance for sufficient water absorption prevention can be obtained. The amount of the emulsifier mixture is preferably 0.1 to 5% by weight, more preferably 0.1 to 0.5% by weight.

An intended organosilicon composition can be produced by stirring the above alkylalkoxysilane and/or condensate thereof and 0.1 to 50% by weight, based on the total amount of the organosilicon composition, of an emulsifier mixture of the above anionic emulsifier with the above nonionic emulsifier at a high rate by means of a homomixer and adding water little by little while the above ingredients are stirred. Even if the emulsifier mixture is not completely dissolved in the silane, a resultant composition, if mixed homogeneously by the above stirring, gives a stable emulsion after water is added. When water is added little by little as described above, at an initial stage, the composition sometimes shows a high concentration and viscosity, and insolubles sometimes occur, or the composition sometimes becomes a transparent liquid. However, after the amount of water increases, a homogeneous emulsion can be obtained.

The amount of the above organosilicon composition (to be referred to as "silane component" hereinafter) in the emulsion is 1 to 70% by weight, preferably 1 to 50% by weight, more preferably 5 to 40% by weight. When the amount of the silane component is less than 1% by weight, it is impossible to impart civil engineering and construction materials such as concrete with full performance of prevention of water absorption by coating the concrete once. Further, when such materials are coated twice or more, the permeation degree of the silane component applied for a second time or later is decreased. Therefore, an emulsion having less than 1% by weight of the silane component is not suitable for use intended in this invention. When the amount of the silane component is more than 70% by weight, the resultant emulsion has a high viscosity so that it is difficult to coat the above material with the emulsion. The viscosity of the emulsion hardly influences how deep the emulsion permeates. However, coating nonuniformity appears, and the permeation rate of the emulsion is decreased. In view of these points and economy, the amount of the silane component is not more than 50% by weight, preferably not more than 40% by weight.

The second aspect of this invention provides an organosilicon composition having excellent fungiproof properties, which comprises (a) an alkylalkoxysilane and/or a condensate thereof and (b) an organosilicon compound having an alkoxysilyl group and a quaternary ammonium salt group in the molecule and/or a condensate thereof (to be sometimes referred to as "organosilicon compound" hereinafter). Further, there is also provided an organosilicon composition emulsion prepared by emulsifying the above organosilicon composition with water and an emulsifier as required. The present inventor has found that the organosilicon compound having an alkoxysilyl group and a quaternary ammonium salt group in the molecule reacts with other alkoxysilane to form a highly strong covalent bond, and exhibits remarkable endurance of fungiproof properties, and on the basis of this finding, the second aspect of this invention has been completed.

The alkylalkoxysilane and/or a condensate thereof, used in the second aspect of the invention, are/is not critical, and may be selected from alkyltrialkoxysilane and dialkyldialkoxysilane. In general, the alkylalkoxysilane is selected from those in which an alkyl group directly bonded to silicon has 1 to 20 carbon atoms, preferably 6 to 20 carbon atoms, and the alkoxy group directly bonded to silicon has 1 to 2 carbon atoms. Examples of the alkylalkoxysilane are methyltrimethoxysilane, ethyltrimethoxysilane, propyltrimethoxysilane, butyltrimethoxysilane, pentyltrimethoxysilane, hexyltrimethoxysilane, heptyltrimethoxysilane, octyltrimethoxysilane, nonyltrimethoxysilane, decyltrimethoxysilane, undecyltrimethoxysilane, dodecyltrimethoxysilane, tridecyltrimethoxysilane, tetradecyltrimethoxysilane, pentadecyltrimethoxysilane, hexadecyltrimethoxysilane, heptadecyltrimethoxysilane, octadecyltrimethoxysilane, nonadecyltrimethoxysilane, eicosyltrimethoxysilane, phenyltrimethoxysilane, octylmethyldimethoxysilane, octadecylmethyldimethoxysilane, diphenyldimethoxysilane, dimethyldimethoxysilane, methylvinyldimethoxysilane, γ-methacryloxypropyltrimethoxysilane, γ-methacryloxypropylmethyldimethoxysilane, methyltriethoxysilane, ethyltriethoxysilane, propyltriethoxysilane, butyltriethoxysilane, pentyltriethoxysilane, hexyltriethoxysilane, heptyltriethoxysilane, octyltriethoxysilane, nonyltriethoxysilane, decyltriethoxysilane, undecyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane, nonadecyltriethoxysilane, eicosyltriethoxysilane, vinyltriethoxysilane, octylmethyldiethoxysilane, octadecylmethyldiethoxysilane, diphenyldiethoxysilane, methylvinyldiethoxysilane, mixtures of these, and condensates of these, although the alkylalkoxysilane shall not be limited to the above examples.

The alkylalkoxysilane used as a component for the emulsion in the second invention is also the most preferably selected from those in which an alkyl group directly bonded to silicon has 6 to 20 carbon atoms and the alkoxy group is ethoxy. Examples of such an alkylalkoxysilane are those which have been specified with regard to the first invention. Further, the reason for the selection of the alkyl group having 6 to 20 carbon atoms is as specified concerning the first invention.

In addition, for the same reason as that described with regard to the alkylalkoxysilane in the first invention, the alkylalkoxysilane may be selected from those prepared by converting α-olefin compounds and hydrosilyl compounds into monoalkyltrialkoxysilane and/or dialkyldialkoxysilane, which conversion reaction can be carried out at a low cost.

Examples of the organosilicon compound having an alkoxysilyl group and a quaternary ammonium salt group in the molecule or a condensate thereof are as follows.

a) Quaternary compounds prepared by conversion from a reaction product of an organosilicon compound having alkoxysilyl and epoxy groups and an organic amine with an acid.

b) Quaternary compounds prepared by conversion from a reaction product of an organosilicon compound having alkoxysilyl and amino groups and an organic epoxy compound with an acid.

c) Quaternary compounds prepared by conversion from aminoalkoxysilane with an acid.

Examples of the organosilicon compound having alkoxysilyl and epoxy groups, described in the above a), are hydrolyzable silanes such as γ-glycidoxypropyltrimethoxysilane, γ-glycidoxypropyltriethoxysilane, γ-glycidoxypropylmethyldimethoxysilane, γ-glycidoxypropylmethyldiethoxysilane, γ-glycidoxypropylmethylmethoxysilane, γ-glycidoxypropyldimethylethoxysilane, β-(3,4-epoxycyclohexy)ethyltriethoxysilane.

The organic amine is selected from primary, secondary and tertiary amines. Examples of the organic amine are primary amines such as n-propylamine, isopropylamine, n-butylamine, n-amylamine, cyclohexylamine, monoethanolamine, aniline, benzylamine, octylamine, oleylamine, stearylamine, γ-aminopropyltriethoxysilane, aminomethyltrimethoxysilane, a organosiloxane-modified primary amine, 4-fluroaniline, 2,2-bis[(4-aminophenyl)hexafluoropropane], 4-aminobenzotrifluoride, etc., secondary amines such as diethylamine, di-(n-propyl)amine, diamylamine, diethanolamine, etc., tertiary amines such as triethylamine, tributylamine, etc., and mixtures of these. The amount of the organic amine is not specially limited. However, it is preferably 0.1 to 2 moles per mole of the epoxy group of the organosilicon compound having alkoxysilyl and epoxy groups. The organic amine and the organosilicon compound are mixed, the heated at 60° to 100° C. for 2 to 8 hours while these are sealed and stirred, whereby a silicon-containing amine is produced. The silicon-containing amine is neutralized by adding an equimolar acid to give a quaternary organosilicon compound having a relatively low molecular weight.

The above acid is freely selected from those which form an ammonium salt of the formed amine. Examples of the acid are inorganic acids such as hydrochloric acid, sulfuric acid, nitric acid, etc., organic acids such as acetic acid, propionic acid, benzoic acid, etc., chlorosilanes such as trimethylchlorosilane, dimethyldichlorosilane, silicon tetrachloride, etc., titanium tetrachloride, zirconium tetrachloride, and the like.

Examples of the organosilicon compound having alkoxysilyl and amino groups, described in the above b), are γ-aminopropyltriethoxysilane, N-(β-aminoethyl)-γ-aminopropyltriethoxysilane, N-(β-aminoethyl)-γ-aminopropylmethyldimethoxysilane, etc.

Examples of the organic epoxy compounds are allylglycidylether, glycidyl methacrylate, a bisphenol type epoxy resin, a novolak type epoxy resin, epoxidized soybean oil, etc., although the organic epoxy compound shall not be limited to these compounds. The acid used in the above b) is also selected from the acids specified above.

Examples of the aminoalkoxysilane used in the above c) are γ-aminopropyltriethoxysilane, N-β-aminoethyl)-γ-aminopropyltrimethoxysilane, or N-(β-aminoethyl)-γ-aminopropylmethyldimethoxysilane with an acid, and 3-(trimethoxysilyl)-propyloctadecyldimethylammonium chloride supplied by Dow-Coning.

When an aqueous emulsion is prepared as required, the above silane compound can be emulsified with water and an emulsifier. The emulsifier is selected from anionic, nonionic and cationic emulsifiers. Examples of the anionic emulsifier are fatty acid salt, alkyl sulfate ester salt, alkylbenzene sulfonate, alkylnaphthalene sulfonate, alkyldiphenylether disulfonate, alkyl phosphate, polyoxyethylenealkyl or alkylallyl sulfate ester salt, naphthalene sulfonic acid formalin condensate, polyoxyethylene alkylphosphate ester, etc. Examples of the nonionic emulsifier are polyoxyethylenealkylether, polyoxyethylenealkylallylether, oxyethyleneoxypropylene block copolymer, sorbitan fatty acid ester, polyoxyethylene sorbitan fatty acid ester, glycerin fatty acid ester, polyoxyethylene fatty acid ester, polyoxyethylenealkylamine, etc. Examples of the cationic emulsifier are alkylamine salt, quaternary ammonium salt, alkyl betaine, amine oxide, lecithin, etc. The emulsifiers described in the first invention are most preferably usable. The above emulsifiers may be used in combination as required. In order to avoid water resistance, the amount of the emulsifier is 0.1 to 50% by weight based on the silane component.

The amount of the silane component and the organosilicon compound in the aqueous emulsion is preferably 1 to 70% by weight. When this amount is less than 1% by weight, it is required to carry out the coating of the emulsion a plurality of times in order to obtain sufficient performance of the organosilicon composition. When the above amount is more than 70% by weight, the resultant emulsion shows poor shelf stability, and the viscosity thereof increases. Thus, it is difficult to apply the emulsion uniformly. The above amount is desirably 5 to 40% by weight, and in such a case, both sufficient properties of shelf stability and water resistance can be obtained.

The organosilicon compound can be emulsified according to a generally known method. For example, while the organosilicon compound or a condensate thereof and water are stirred with a homomixer at a high rate, the above emulsifier and the silane component are added little by little, whereby an aqueous emulsion is obtained.

The amount of the organosilicon compound having an alkoxysilane group and a quaternary ammonium salt group in the molecule or a condensate thereof on the basis of the total amount of the composition of the second invention is 0.1 to 90% by weight, preferably 50% by weight or less. When this amount is more than 50% by weight, a permeation amount is sometimes too small to give sufficient waterproof function.

According to the first invention, there is provided an organosilicon composition capable of preventing deterioration of civil engineering and construction materials such as concrete, etc., and imparting them with long durability by application of it on their surfaces, since it permeates deep inside the materials and forms a bond and an excellent waterproof layer after dried. Further, the composition of the first invention has a easily condensable alkoxy group, but is free from an increase in viscosity, gelation and degradation of performance as a barrier preventer even after it has been stored at room temperature for six months. Further, in an emulsion of the composition of the first invention, droplets of hydrophobic silane rendered hydrophilic with the nonionic emulsifier to some extent are further rendered hydrophilic with a small amount of the anionic emulsifier and stabilized in water. Therefore, the composition of the first invention gives a stable emulsion which is free from separation for a long period of time.

According to the first invention, a stable emulsion can be obtained with a small amount of the emulsifier mixture. Therefore, the present invention makes an organosilicon composition fully exhibit its performance at a highest level and provides an organosilicon composition which exhibits excellent water repellency.

Additives such as a dye and a pigment may be incorporated into the composition of the first invention.

According to the second invention, there is provided an organosilicon composition which can be easily produced from a wide range of materials at a low cost, and which can give a coating having durable fungiproof properties and antibacterial properties due to the use of an organosilicon compound having a quaternary ammonium salt structure. The organosilicon composition of the second invention can be formed into an aqueous emulsion with an emulsifier, and the emulsion permeates deep inside civil engineering and construction materials such as concrete to react with a hydrophilic group within the materials and form a waterproof layer although it forms an aqueous coating. Therefore, the organosilicon composition of the second invention can impart the materials with waterproofness and fungiproof properties. Further, the composition of the second invention also exhibits excellent shelf stability, or is free from an increase in viscosity after it has been stored at 50° C. for one month.

As described above, the compositions of the first and second inventions are very useful in a civil engineering and construction field.

EXAMPLE 1

20 Grams of n-octyltriethoxysilane, 3.98 g of polyoxyethylenestearyl ether and 0.02 g of sodium laurate were mixed, and while the resultant mixture was stirred at a high rate of more than 1,000 rpm, 76 g of water was gradually added to give a white aqueous emulsion, which was stable for 6 months or more at room temperature.

EXAMPLE 2

Example 1 was repeated except that 3.98 g of the polyoxyethylenestearyl ether was replaced with 3.98 g of polyoxyethylenesorbitan trioleate, whereby a white aqueous emulsion was obtained. The white aqueous emulsion was stable for 6 months or more at room temperature.

EXAMPLE 3

Example 1 was repeated except that 3.98 g of the polyoxyethylenestearyl ether was replaced with 3.98 g of SILWET L-7604 (silicone-containing nonionic emulsifier, supplied by Nippon Unicar K.K.), whereby a white aqueous emulsion was obtained. The white aqueous emulsion was stable for 6 months or more at room temperature.

EXAMPLE 4

Example 1 was repeated except that 3.98 g of the polyoxyethylenestearyl ether was replaced with 3.98 g of EFTOP EF-121 (fluorine-containing nonionic emulsifier, supplied by Shin-Akita Kasei K.K.), whereby a white aqueous emulsion was obtained. The white aqueous emulsion was stable for 6 months or more at room temperature.

EXAMPLE 5

50 Grams of octadecyltriethoxysilane, 10 g of hexyltrimethoxysilane, 0.2 g of polyoxyethylenestearyl ether and 0.04 g of sodium laurylsulfate were mixed, and while the resultant mixture was stirred at a high rate of 1,000 rpm or more, 40 g of water was gradually added to give a white aqueous emulsion, which was stable for 6 months or more at room temperature.

EXAMPLE 6

20 Grams of decyltrimethoxysilane, 7 g of polyoxyethylenenonylphenyl ether (HLB 3.5), 1.0 g of polyoxyethylenenonylphenyl ether (HLB 13.5) and 0.02 g of sodium laurylsulfate were mixed, and while the resultant mixture was stirred at a high rate of 1,000 rpm, 72 g of water was gradually added to give a white aqueous emulsion, which was stable for 6 months or more at room temperature. When part of the white aqueoues emulsion was stored at 50° C., it caused a precipitate in one month. In addition, when the aqueous emulsions obtained in Examples 1 to 5 were stored at 50° C. for one month, no precipitate was formed.

EXAMPLE 7

20 Grams of a partial condensate of hexyltriethoxysilane, 30 g of octadecyltriethoxysilane, 10 g of hexyltrimethoxysilane, 0.2 g of polyoxyethylenestearyl ether and 0.04 g of sodium laurylsulfate were mixed, and while the resultant mixture was stirred at a high rate of 1,000 rpm or more, 40 g of water was gradually added to give a white aqueous emulsion, which was stable for 6 months or more at room temperature. When a part of the white aqueous emulsion was stored at 50° C. for one month, no precipitate was formed.

EXAMPLE 8

50 Grams of octadecyltriethoxysilane, 10 g of hexyltrimethoxysilane, 1.0 g of polyoxyethylenestearyl ether and 0.04 g of sodium laurylsulfate were mixed, and while the resultant mixture was stirred at a high rate of 1,000 rpm or more, 40 g of water was gradually added to give a white aqueous emulsion, which was stable for 6 months or more at room temperature. When part of the white aqueous emulsion was stored at 50° C. for one month, no precipitate was formed.

COMPARATIVE EXAMPLE 1

20 Grams of n-octyltriethoxysilane and 4 g of polyoxyethylenestearyl ether were mixed, and while the resultant mixture was stirred at a high rate of 1,000 rpm or more, 76 g of water was gradually added to give a white aqueous emulsion, which separated into two layers within 24 hours at room temperature.

COMPARATIVE EXAMPLE 2

20 Grams of n-octyltriethoxysilane, 3.60 g of polyoxyethylenestearyl ehter and 1.0 g of sodium laurylsulfate were mixed, and while the resultant mixture was stirred at a high rate of 1,000 rpm or more, 76 g of water was gradually added to give a white aqueous emulsion, which was separated into two layers within 24 hours at room temperature.

COMPARATIVE EXAMPLE 3

20 Grams of n-octyltriethoxysilane, 2.00 g of polyoxyethylenestearyl ether and 2.00 g of sodium laurylsulfate were mixed, and while the resultant mixture was stirred at a high rate of 1,000 rpm, 76 g of water was gradually added to give a white aqueous emulsion, which separated into two layers within 1 hour at room temperature.

COMPARATIVE EXAMPLE 4

20 Grams of n-octyltriethoxysilane and 4.00 g of sodium laurylsulfate were mixed, and while the resultant mixture was stirred at a high rate of 1,000 rpm or more, 76 g of water was added. However, no emulsion was obtained.

The results in the above Examples and Comparative Examples are summarized in Table 1.

TABLE 1

| | Appearance immediately after preparation | Time before separation (self stability) | Water absorption ratio (%) |
|---|---|---|---|
| Ex. 1 | aqueous white emulsion | 6 months or more | 18.6 |
| Ex. 2 | aqueous white emulsion | 6 months or more | 19.3 |
| Ex. 3 | aqueous white emulsion | 6 months or more | 17.8 |
| Ex. 4 | aqueous white emulsion | 6 months or more | 20.1 |
| Ex. 5 | aqueous white emulsion | 6 months or more | 5.1 |
| Ex. 6 | aqueous white emulsion | 6 months or more | 13.5 |
| Ex. 7 | aqueous white emulsion | 6 months or more | 4.8 |
| Ex. 8 | aqueous white emulsion | 6 months or more | 7.2 |
| CEx. 1 | aqueous white emulsion | within one day | 20.6 |
| CEx. 2 | aqueous white emulsion | within one day | 20.3 |
| CEx. 3 | aqueous white emulsion | within one day | 19.1 |
| CEx. 4 | Separated into two layers* | not emulsified | 21.0 |

Notes:
Ex. = Example, CEx = Comparative Example
*The phrase of "separated into two layers" refers to a state in which an upper layer has higher transparency than a lower layer and the lower layer is opaque as compared with the upper layer.

Water absorption ratio

An emulsion was coated on a 4 cm×4 cm×8 cm substrate mortar having an age of four months (JIS R5201) in an air-dried state such that a build-up was 300 g/m², and the resultant coating was air-dried for 28 days. Then, the substrate mortar was immersed in water for 7 days according to JIS S1404 to determine a water absorption on the basis of the following equation.

Water absorption ratio=amount of water absorbed by a coated substrate (g)/amount of water absorbed by an uncoated substrate (g) for 7 days×100

EXAMPLE 9

20 Grams of n-octyltriethoxysilane, 3.98 g of polyoxyethylenestearyl ether, 0.02 g of sodium laurylsulfate, 1 g of γ-aminopropyltriethoxysilane and 0.1 g of 36% hydrochloric acid were mixed, and while the resultant mixture was stirred at a high rate of 1,000 rpm or more, 75 g of water was added to give a white emulsion, which was stable for 6 months or more at room temperature.

EXAMPLE 10

26.8 Grams (0.1 mol) of oleylamine and 23.6 g (0.1 mol) of γ-glycidoxypropyltrimethoxysilane were mixed, and the resultant mixture was allowed to react in a closed container under heat at 75° C. 25 Grams of n-hexyltrimethoxysilane, 0.6 g of acetic acid and 70 g of isopropyl alcohol were added to 5.04 g of the above reaction mixture, and the resultant mixture was allowed to react at 60° C. for 3 hours.

EXAMPLE 11

14.2 Grams (0.1 mol) of glycidyl methacrylate and 22.1 g (0.1 mol) of γ-aminopropyltriethoxysilane were mixed, and resultant mixture was allowed to react in a closed container. 26.37 Grams of n-butyltriethoxysilane, 0.101 g of 36% hydrochloric acid and 70 g of ethanol were added to 3.63 g of the above reaction mixture, and the resultant mixture was allowed to react at 60° C. for 3 hours.

EXAMPLE 12

50 Grams of octadecyltriethoxysilane, 10 g of hexyltrimethoxysilane, 0.2 g of polyoxyethylenestearyl ether, 0.04 g of sodium laurylsulfate and 1 g of 3-(trimethoxysilyl)-propyloctadecyldimethylammonium chloride were mixed, and while the resultant mixture was stirred at a high rate of 1,000 rpm or more, 40 g of water was gradually added to give a white emulsion, which was stable at room temperature for 6 months or more.

EXAMPLE 13

100 Grams of isopropyl alcohol, 95 g of methyltrimethoxysilane and 5 g of a 0.1N hydrochloric acid aqueous solution were mixed, and hydrolyzed and polycondensed at 60° C. for 5 hours. 20 Grams of the resultant condensate, 30 g of n-octyltritriethoxysilane, and 1 g of N-(β-aminoethyl)-γ-aminopropyltriethoxysilane were mixed, and further, 50 g of isopropyl alcohol was added to give an alcohol solution having a silane concentration of about 40%.

EXAMPLE 14

100 Grams of isopropyl alcohol, 95 g of methyltrimethoxysilane and 5 g of a 0.1N hydrochloric acid aqueous solution were mixed, and hydrolyzed and polycondensed at 60° C. for 5 hours. 20 Grams of the resultant condensate, 30 g of n-hexyltriethoxysilane and 1 g of 3-(trimethoxysilyl)propyloctadecyldimethylammonium chloride were mixed, and 0.2 g of polyoxyethylenestearyl ether and 0.04 g of sodium laurylsulfate were further added. While the resultant mixture was stirred at a high rate of 1,000 rpm or more, 50 g of water was gradually added to give a white emulsion, which was stable for 6 months or more at room temperature.

COMPARATIVE EXAMPLE 5

20 Grams of n-octyltriethoxysilane, 3.98 g of polyoxyethylenestearyl ether and 0.02 g of sodium laurylsulfate were mixed, and while the resultant mixture was stirred at a high rate of 1,000 rpm or more, 75 g of water was gradually added to give a white emulsion, which was stable for 6 months or more at room temperature.

COMPARATIVE EXAMPLE 6

25 Grams of n-hexyltrimethoxysilane, 0.101 g of 36% hydrochloric acid and 75 g of isopropyl alcohol were mixed, and allowed to react at 60° C. for 3 hours to give an n-hexyltrimethoxysilane alcohol solution having a silane concentration of about 25%.

COMPARATIVE EXAMPLE 7

100 Grams of isopropyl alcohol, 95 g of methyltrimethoxysilane and 5 g of a 0.1N hydrochloric acid aqueous solution were mixed, and hydrolyzed and polycondensed at 60° C. for 5 hours. 20 Grams of the resultant condensate and 30 g of n-octyltriethoxysilane were mixed, and further, 50 g of isopropyl alcohol was added to give an alcohol solution having a silane concentration of about 40%.

COMPARATIVE EXAMPLE 8

20 Grams of n-octyltriethoxysilane, 3.98 g of polyoxyethylenestearyl ether, 0.02 g of sodium laurylsulfate and 0.01 g of a commercially available general-purpose fungi-proofing agent were mixed, and while the resultant mixture was stirred at 1,000 rpm or more, 75 g of water was gradually added to give a white emulsion, which was stable for 6 months or more at room temperature.

The samples obtained in the above Examples were tested on the following physical properties as follows.

Shelf stability test

20 Grams of a prepared sample was charged into a 30 ml sample bottle, and allowed to stand at room temperature, and a change in appearance was observed.

Water absorption test

A sample was coated on an entire surface of a 4 cm×4 cm×8 cm mortar test piece (JIS R-5201) at 300 g/m$^2$, and dried at room temperature for 12 hours and at 100° C. for 2 hours. Then, a water absorption ratio of the coated test piece for 24 hours was determined according to JIS A-1404.

Water absorption ratio = amount of water absorbed by waterproof-coated test piece (g)/amount of water absorbed by an uncoated test piece (g)×100

In addition, the sample which showed poor shelf stability and separated into two layers immediately after prepared was shaken fully to form a homogeneous solution, and the solution was applied.

Permeability test

A sample piece subjected to the water absorption test was dried at 100° C. for 1 hour, and then cut to prepare four fresh side surfaces. A 0.5% methylene blue aqueous solution was applied to these surfaces, and five places on each of the four surfaces were measured for a depth of a portion which was not dyed due to water repellency.

Fungiproof test

The fungiproof test was carried out according to a general test method described in JIS-Z-2911.

Fungi

*Aspergillus Niger*, FERM S-2,
*Penicillium Funiculosum*, FERM S-6,
*Cladosporium Cladosporioides*, FERM S-8,
*Aureobasidium Pullulans*, FERM S-9,
*Gliocladium Virens*, FERM S-10

Culture grape sugar/peptone/agar/purified water = 40/10/25/1000

Test method

A test piece prepared by wholly coating a 3 cm×3 cm mortar was subjected to a weatherproof testing dew cycle test for 100 hours, and then placed on the above culture in a plate form. A suspension of a mixture of the above five fungi was sprayed on the test piece and the culture, and the test piece and the culture were held under atmosphere having a temperature of 28°±2° C. and a humidity of not less than 95%.

Evaluation

3: No growth of hypha was observed on the sprayed portion of the test piece.

2: An area of the portion(s) of the test piece where growth of hypha was observed was not more than ⅓ of the total area of the sprayed portion of the test piece.

1: An area of the portion(s) of the test piece where growth of hypha was observed was more than ⅓ of the total area of the sprayed portion of the test piece.

The results of the above tests are shown in Table 2.

TABLE 2

| | Shelf stability | Water absorption ratio (%) | Depth of permeation (mm) | Fungi occurrence state |
|---|---|---|---|---|
| Ex. 9 | 6 months or more | 9.6 | 4.6 | 3 |
| Ex. 10 | 6 months or more | 7.5 | 4.0 | 3 |
| Ex. 11 | 6 months or more | 9.2 | 3.8 | 3 |
| Ex. 12 | 6 months or more | 9.8 | 4.3 | 3 |
| Ex. 13 | 6 months or more | 6.6 | 4.6 | 3 |
| Ex. 14 | 6 months or more | 10.3 | 4.8 | 3 |
| CEx. 5 | 6 months or more | 13.6 | 4.7 | 1 |
| CEx. 6 | 6 months or more | 6.9 | 3.7 | 1 |
| CEx. 7 | 6 months or more | 8.2 | 3.4 | 1 |
| CEx. 8 | 6 months or more | 11.6 | 4.7 | 1 |

EXAMPLES 15-16, AND COMPARATIVE EXAMPLES 9-11

Emulsion samples were prepared from an alkylalkoxysilane, an emulsifier and water in amounts shown in Table 3 with a homomixer, and the samples were observed on their emulsion state and subjected to the following water absorption test.

Water absorption test

A sample was coated on an entire surface of a 7 cm×7 cm×2 cm mortar test piece (JIS R-5201) at 300 g/m$^2$, and aged at room temperature for 5 days. Then, the test piece and an uncoated test piece were immersed in water for 24 hours. The water absorption ratio of each test piece was determined on the basis of the following equation.

Water absorption (g) for 24 hours = weight (g) of a test piece after 24 hours of the immersion-weight (g) of the test piece before the immersion.

Water absorption ratio after 24 hours = amount of water absorbed by a sample-coated test piece (g)/amount of water absorbed by an uncoated test piece (g) × 100

In addition, those samples in a poor emulsification state were not subjected to the water absorption test.

Table 3 shows the results of the observation and the water absorption test.

TABLE 3

| | Alkyl-alkoxysilane concentration (wt. %) | Emulsifier composition (wt. %) | | | Concentration of emulsifiler to silane (wt. %) | Test results | |
|---|---|---|---|---|---|---|---|
| | | Nonionic emulsifier | Anionic emulsifier | Cationic emulsifier | | Emulsification state | Water absorption ratio after 24 hours |
| Ex. 15 | 40 | 99.5 | 0.5 | — | 0.5 | A | 7.5 |
| Ex. 16 | 40 | 99.5 | 0.5 | — | 5.0 | A | 14.3 |
| CEx. 9 | 40 | 100 | — | — | 0.5 | B | — |
| CEx. 10 | 40 | 99.5 | — | 0.5 | 0.5 | B | — |
| CEx. 11 | 40 | 100 | — | — | 5.0 | A | 16.3 |

Notes:
Ex. = Example, CEx. = Comparative Example
Alkylalkoxysilane = n-hexyltriethoxysilane
Nonionic emulsifier = Emalgen 709 (Kao Soap Co., Ltd.)
Anionic emulsifier = Emal O (Kao Soap Co., Ltd.)
Cationic emulsifier = Esocard C-25 (Lion Akzo)
A = emulsified
B = not emulsified The above results show the following: Even if the concentration of the emulsifier (mixture of a nonionic emulsifier with an anionic emulsifier) to silane is 0.5% by weight, the organosilicon composition of the present invention can be emulsified, whereas a composition containing a nonionic emulsifier alone and a composition containing a mixture of a nonionic emulsifier with a cationic emulsifier cannot be emulsified when the emulsifier concentration is 0.5% by weight. Further, since the organosilicon composition of the present invention can be emulsified even if the amount of the emulsifier relative to the alkylalkoxysilane is small, the organosilicon composition of the present invention (the concentration of the emulsifier = 0.5% by weight) is excellent in the water absorption ratio over the other sample which can be emulsified only when the concentration of the emulsifier is high.

What is claimed is:

1. An organosilicon composition comprising 99.9 to 50% by weight of an monoalkyltrialkoxysilane and/or a condensate thereof and 0.1 to 50% by weight of an emulsifier mixture containing 0.01 to 20% by weight, based on the total amount of the emulsifier mixture, of an anionic emulsifier and 80 to 99.99% by weight, based on the total amount of the emulsifier mixture, of a nonionic emulsifier.

2. A composition according to claim 1, which comprises 0.1 to 5% by weight of the emulsifier mixture and 99.9 to 95% by weight of the monoalkyltrialkoxysilane and/or the condensate thereof.

3. A composition according to claim 1, which comprises 0.1 to 0.5% by weight of the emulsifier mixture and 99.9 to 99.5% by weight of the monoalkyltrialkoxysilane and/or the condensate thereof.

4. A composition according to claim 1, wherein the emulsifier mixture contains 0.1 to 20% by weight of the anionic emulsifier.

5. A composition according to claim 1, wherein the monoalkyltrialkoxysilane is a monoalkyltrialkoxysilane whose alkyl group has 6 to 20 carbon atoms.

6. A composition according to claim 1, wherein the monoalkyltrialkoxysilane is a monoalkytrialkoxysilane whose alkoxy group is at least one member selected from the class consisting of methoxy and ethoxy groups.

7. A composition according to claim 1, wherein the nonionic emulsifier is a liquid at room temperature.

8. A composition according to claim 1, wherein the nonionic emulsifier is polyalkylene-modified polydimethylsiloxane or fluorinated alkyl group-containing polyalkylene oxide.

9. A composition according to claim 1, which further contains an organosilicon compound containing an alkoxysilyl group and a quaternary ammonium salt group in the molecule and/or a condensate thereof.

10. A composition according to claim 9, which contains 0.1 to 90% by weight, based on the monoalkyltrialkoxysilane and/or an condensate thereof, of the organosilicon compound containing an alkoxysilyl group and a quaternary ammonium salt group in the molecule and/or a condensate thereof.

11. An emulsion comprising the organosilicon composition recited in claim 9, an emulsifier and water.

12. An emulsion comprising the organosilicon composition recited in claim 1 and water.

13. An emulsion according to claim 12, wherein the monoalkyltrialkoxysilane and/or the condensate thereof is contained in an amount of 1 to 70% by weight.

* * * * *